(12) United States Patent
Morley

(10) Patent No.: US 8,478,528 B2
(45) Date of Patent: Jul. 2, 2013

(54) METHODS OF WIRELESSLY ADDING NAVIGATIONAL CONTENT TO A PERSONAL NAVIGATION DEVICE

(75) Inventor: Simon Dean Morley, Auckland (NZ)

(73) Assignee: Mitac International Corp., Kuei-Shan Hsiang, Tao-Yuan Hsien (TW)

( * ) Notice: Subject to any disclaimer, the term of this patent is extended or adjusted under 35 U.S.C. 154(b) by 514 days.

(21) Appl. No.: 12/612,684

(22) Filed: Nov. 5, 2009

(65) Prior Publication Data

US 2011/0106438 A1 May 5, 2011

(51) Int. Cl.
*G01C 21/00* (2006.01)

(52) U.S. Cl.
USPC ........... 701/537; 701/408; 701/484; 701/526; 701/538

(58) Field of Classification Search
USPC .................. 701/400, 408, 418, 425, 430, 484, 701/485, 487, 522, 526, 537, 538; 340/988–996
See application file for complete search history.

(56) References Cited

U.S. PATENT DOCUMENTS

| | | | | |
|---|---|---|---|---|
| 7,616,978 B2 * | 11/2009 | Piekarz | ....................... | 455/575.9 |
| 7,640,098 B2 * | 12/2009 | Stenbock et al. | ............. | 701/528 |
| 7,688,228 B2 * | 3/2010 | Tanizaki et al. | .......... | 340/995.12 |
| 8,055,440 B2 * | 11/2011 | Shintani et al. | ............... | 701/420 |
| 8,155,669 B2 * | 4/2012 | Ziskind et al. | ............. | 455/456.3 |
| 2005/0027442 A1 * | 2/2005 | Kelley et al. | ................... | 701/202 |
| 2007/0259674 A1 * | 11/2007 | Neef et al. | .................. | 455/456.1 |
| 2007/0265772 A1 * | 11/2007 | Geelen | .......................... | 701/208 |
| 2008/0036586 A1 * | 2/2008 | Ohki | ......................... | 340/539.13 |
| 2008/0147304 A1 * | 6/2008 | Pai et al. | ........................ | 701/115 |
| 2008/0167937 A1 * | 7/2008 | Coughlin et al. | .................. | 705/9 |
| 2008/0195306 A1 * | 8/2008 | Moinzadeh et al. | .......... | 701/201 |
| 2008/0319653 A1 * | 12/2008 | Moshfeghi | ..................... | 701/208 |
| 2010/0017109 A1 * | 1/2010 | Pauwels | ......................... | 701/200 |
| 2010/0161490 A1 * | 6/2010 | Alrabady et al. | ............... | 705/50 |
| 2011/0018759 A1 * | 1/2011 | Bennett et al. | ............. | 342/357.4 |
| 2011/0060519 A1 * | 3/2011 | Hunter | .......................... | 701/200 |

FOREIGN PATENT DOCUMENTS

| | | |
|---|---|---|
| TW | M341835 | 10/2008 |
| TW | 200928307 | 7/2009 |
| WO | WO 2009138307 A1 * | 11/2009 |

* cited by examiner

*Primary Examiner* — Thomas H. Tarcza
*Assistant Examiner* — Rami Khatib
(74) *Attorney, Agent, or Firm* — Winston Hsu; Scott Margo

(57) ABSTRACT

A method of wirelessly adding navigational content to a personal navigation device includes changing a mode of the personal navigation device to pairing standby mode, adding navigational content to a computing device, and establishing a direct wireless connection between the personal navigation device and the computing device to add navigational content to the personal navigation device from the computing device when the personal navigation device and the computing device are within range of each other for establishing a wireless connection.

17 Claims, 7 Drawing Sheets

METHODS OF WIRELESSLY ADDING NAVIGATIONAL CONTENT TO A PERSONAL NAVIGATION DEVICE

BACKGROUND OF THE INVENTION

1. Field of the Invention

The invention relates to a personal navigation device, and more particularly, to methods of wirelessly adding navigational content to a personal navigation device.

2. Description of the Prior Art

Global Positioning System (GPS) based navigation devices are well known and are widely employed as in-car navigation devices. Common functions of a navigation device include providing a map database for generating navigation instructions that are then shown on a display of the navigation device. These navigation devices are often mounted on or in the dashboard of a vehicle using a suction mount or other mounting means.

The term "navigation device" refers to a device that enables a user to navigate to a pre-defined destination. The device may have an internal system for receiving location data, such as a GPS receiver, or may merely be connectable to a receiver that can receive location data. The device may compute a route itself, or communicate with a remote server that computes the route and provides navigation information to the device, or a hybrid device in which the device itself and a remote server both play a role in the route computation process. Personal GPS navigation devices are not permanently integrated into a vehicle but instead are devices that can readily be mounted in or otherwise used inside a vehicle. Generally (but not necessarily), they are fully self-contained—i.e. include an internal GPS antenna, navigation software and maps and can hence plot and display a route to be taken.

A typical user of a personal navigation device leaves the personal navigation device in their vehicle when they are not driving the vehicle. Because of this, the user is less motivated to use a computer to add custom point of interest (POI) data, multi-stop routes, or updated map data to the personal navigation device. When wanting to add any of this content to the personal navigation device, the user instead has to carry the personal navigation device out of the car and into the user's house or office in order to connect the personal navigation device to the computer. Once connected, the navigational content can be transferred from the computer to the navigational content through a wired connection, such as a Universal Serial Bus (USB) connection. Content can also be downloaded from the personal navigation device to the user's computer. For instance, many users now enjoy downloading traveling routes or a traveling diary that they have created using a personal navigation device. In either case, whether transmitting data to the personal navigation device from the computer, or vice versa, the user still needs to physically carry the personal navigation device to connect with the computer.

Please refer to FIG. 1. FIG. 1 is a flowchart illustrating the prior art method of adding navigational content to a personal navigation device through a computer. Steps contained in the flowchart will be explained below.

Step 100: Start.
Step 102: The user removes the personal navigation device from the user's vehicle.
Step 104: The user connects the personal navigation device to a computer with a wired connection such as a USB cable and sets the personal navigation device to pairing mode so it can pair with the computer. The computer is usually located in the user's home or office, meaning that the user has to carry the personal navigation device out of the vehicle for connection with the computer.
Step 106: The user transfers navigational content from the computer to the personal navigation device.
Step 108: The user completes the transfer and returns the personal navigation device back to the vehicle.
Step 110: End.

As can be seen above, having to remove the personal navigation device from the user's vehicle to pair the personal navigation device with the computer creates unnecessary inconvenience for the user that makes the user less likely to pair the personal navigation device with the computer.

SUMMARY OF THE INVENTION

It is therefore one of the primary objectives of the claimed invention to provide a way to provide methods of wirelessly transferring navigational content from the computer to the personal navigation device to eliminate the need for the user to physically carry the personal navigation device out of the vehicle to pair with the computing device.

According to an exemplary embodiment of the claimed invention, a method of wirelessly adding navigational content to a personal navigation device is disclosed. The method includes changing a mode of the personal navigation device to pairing standby mode, adding navigational content to a computing device, and establishing a direct wireless connection between the personal navigation device and the computing device to add navigational content to the personal navigation device from the computing device when the personal navigation device and the computing device are within range of each other for establishing a wireless connection.

According to another exemplary embodiment of the claimed invention, a method of wirelessly adding navigational content to a personal navigation device is disclosed. The method includes adding navigational content to a computing device, uploading the navigational content from the computing device to an internet server through an internet connection of the computing device and storing the navigational content on the internet server, changing a mode of the personal navigation device to pairing mode, and establishing a wireless internet connection for connecting the personal navigation device to the internet for downloading the navigational content from the internet server to the personal navigation device.

It is an advantage that the personal navigation device of the present invention is able to wirelessly receive updated navigational content for avoiding the need to physically carry the personal navigation device to a computing device for pairing the personal navigation device with the computing device.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
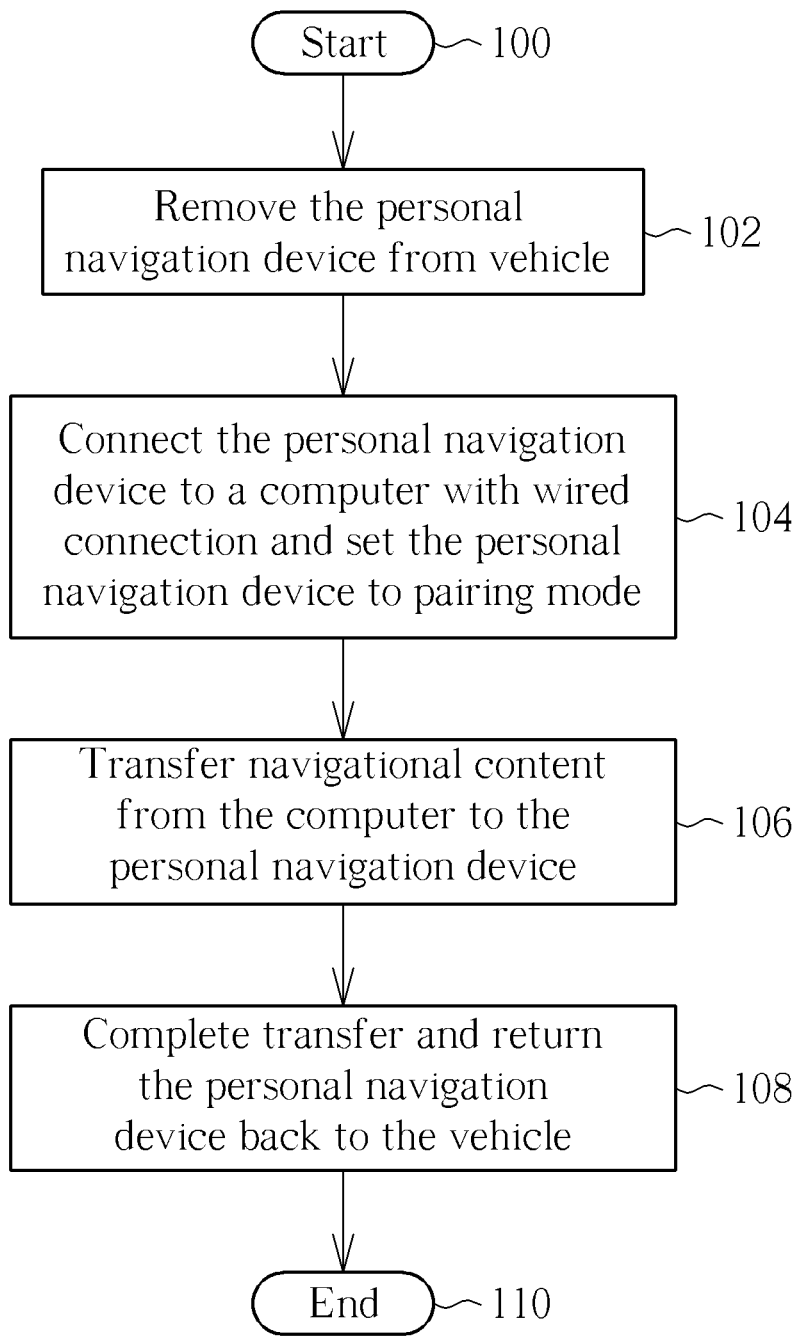
FIG. 1 is a flowchart illustrating the prior art method of adding navigational content to a personal navigation device through a computer.
Figure 2:
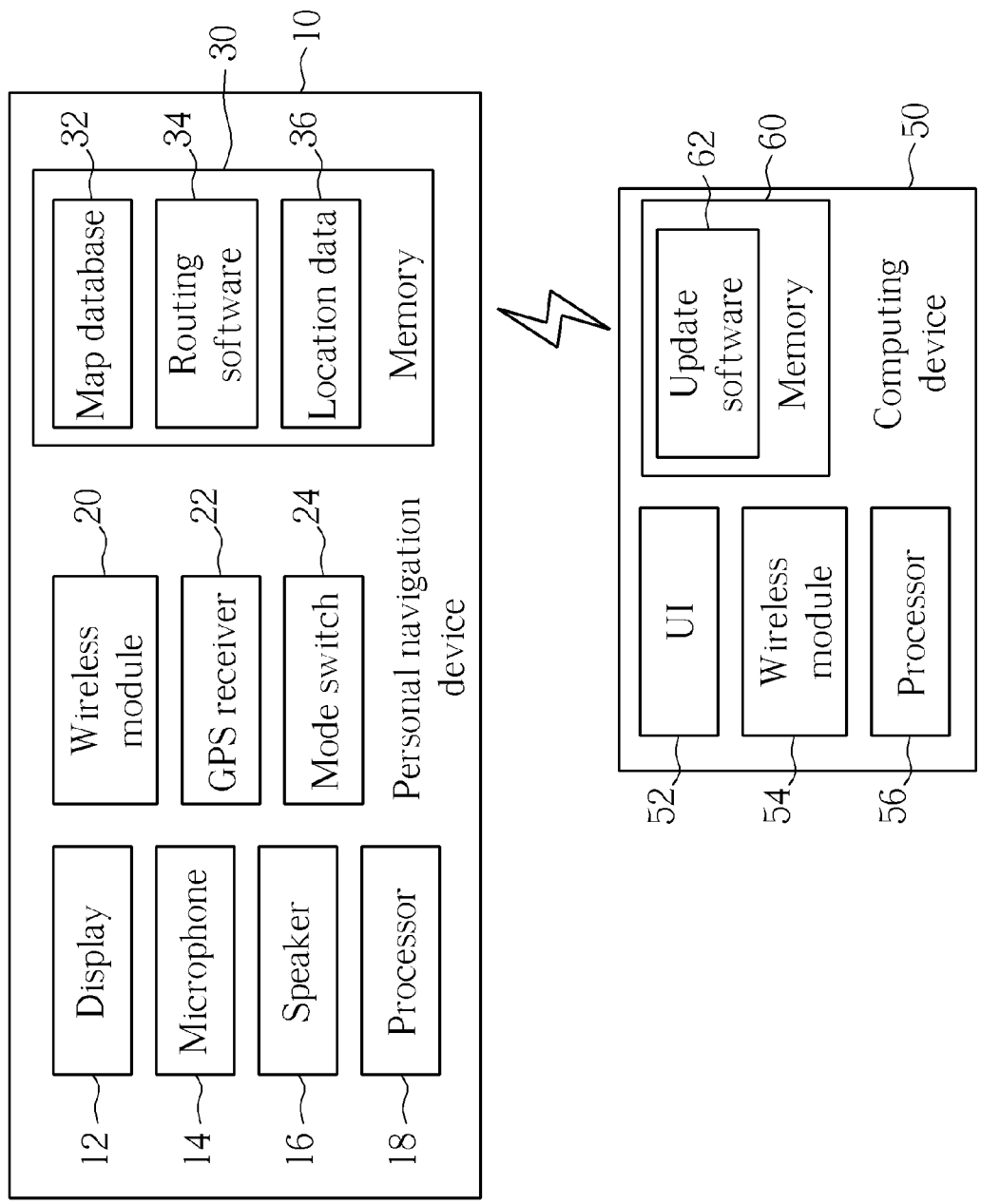
FIG. 2 is a functional block diagram showing a personal navigation device in direct wireless communication with a computing device according to the present invention.

Please refer to FIG. 2. FIG. 2 is a functional block diagram showing a personal navigation device 10 in direct wireless communication with a computing device 50 according to the present invention. The personal navigation device 10 has a user interface containing such devices as a display 12, a microphone 14, and a speaker 16. The display 12 can be a touch-sensitive display for allowing a user of the personal navigation device 10 to input commands and data using the display 12. The personal navigation device 10 also contains a processor 18 for controlling operation of the personal navigation device 10 as well as executing routing software 34 stored in memory 30. The memory 30 also stores a map database 32 for storing map data, address data, POI data, etc. The memory 30 also stores location data 36 for recording locations authorized by a user of the personal navigation device 10 for updating the navigational content stored in the map database 32 as well as for storing locations at which the personal navigation device 10 has previously paired with the computing device 50.

The personal navigation device 10 also contains a wireless module 20 for enabling wireless communication. The wireless module 20 may be a General Packet Radio Service (GPRS) modem, a Bluetooth module that communicates according to high powered Bluetooth specifications, or a general wireless networking module for communicating according to wireless local area network (WLAN) specifications or other suitable wireless standards.

The personal navigation device 10 also comprises a GPS receiver 22 for receiving position information indicating the current position of the personal navigation device 10. For allowing the user to manually toggle the mode of the personal navigation device 10 between pairing mode (or pairing standby mode) and non-pairing mode, the personal navigation device 10 contains a mode switch 24.

The computing device 50 can be a variety of different devices, such as a computer, a mobile phone, a smart phone, or a personal digital assistant (PDA). The computing device 50 comprises a user interface (UI) 52 for allowing the user to input commands and data as well as to receive output from the computing device 50. A wireless module 54 of the computing device 50 is used to directly wirelessly communicate with the wireless module 20 of the personal navigation device 10. The computing device 50 also includes a processor 56 for controlling operation of the computing device 50 as well as executing update software 62 stored in memory 60. The update software 62 provides the user with a way to generate new or updated navigational content to be added to the personal navigation device 10. The navigational content to be transferred from the computing device 50 to the personal navigation device 10 can be selected by the user or stored in a specific part of the memory 60 ahead of time for later transfer to the personal navigation device 10 when a wireless connection between the personal navigation device 10 and the computing device 50 has been established. The present invention includes different embodiments for wirelessly adding content from the computing device 50 to the personal navigation device 10, as will be explained below.

Figure 3:
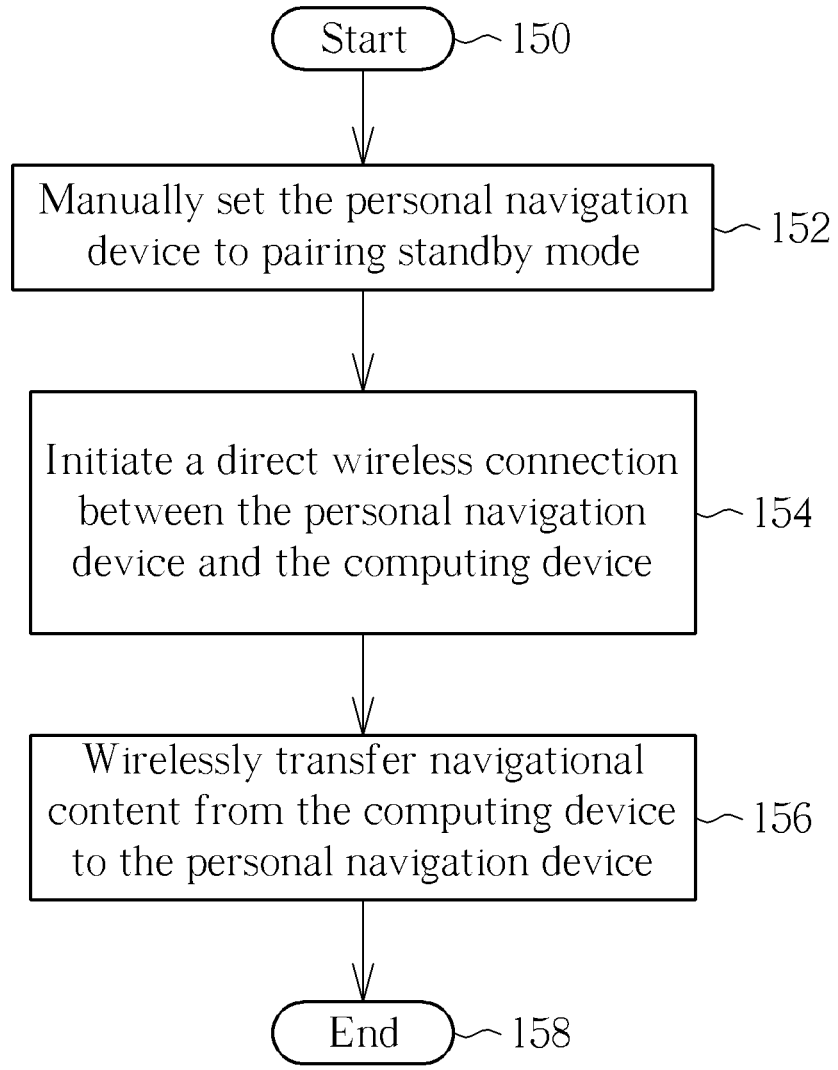
FIGS. 3-4 are flowcharts illustrating present invention methods of adding navigational content to the personal navigation device directly from the computing device.

Please refer to FIG. 3. FIG. 3 is a flowchart illustrating the present invention method of adding navigational content to the personal navigation device 10 from the computing device 50. Steps contained in the flowchart will be explained below.

Step 150: Start.

Step 152: The user of the personal navigation device 10 manually sets the personal navigation device 10 to pairing standby mode using the mode switch 24, and leaves the personal navigation device 10 in the vehicle. The personal navigation device 10 waits for pairing with the computing device 50 to begin.

Step 154: The user initiates a direct wireless connection between the personal navigation device 10 and the computing device 50 while the personal navigation device 10 is in the pairing standby mode. In the direct wireless connection, the wireless module 54 of the computing device 50 is used to directly wirelessly communicate with the wireless module 20 of the personal navigation device 10.

Step 156: Navigational content is wirelessly transferred from the computing device 50 to the personal navigation device 10.

Step 158: End. After the wireless communication is complete, the personal navigation device 10 may optionally turn itself off automatically so as to save power.

In the embodiment shown in FIG. 3, the user manually sets the personal navigation device 10 to pairing standby mode using the mode switch 24. In another embodiment, the personal navigation device 10 can use the GPS receiver 22 to determine the current position of the personal navigation device 10 and automatically change the mode of the personal navigation device 10 to pairing standby mode when the personal navigation device 10 is located at a location at which pairing between the computing device 50 and the personal navigation device 10 has been authorized or has been performed before. These locations can include, for example, the user's home or office. This information about which locations have been previously used for pairing can be stored in the location data 36 of memory 30.

Figure 4:
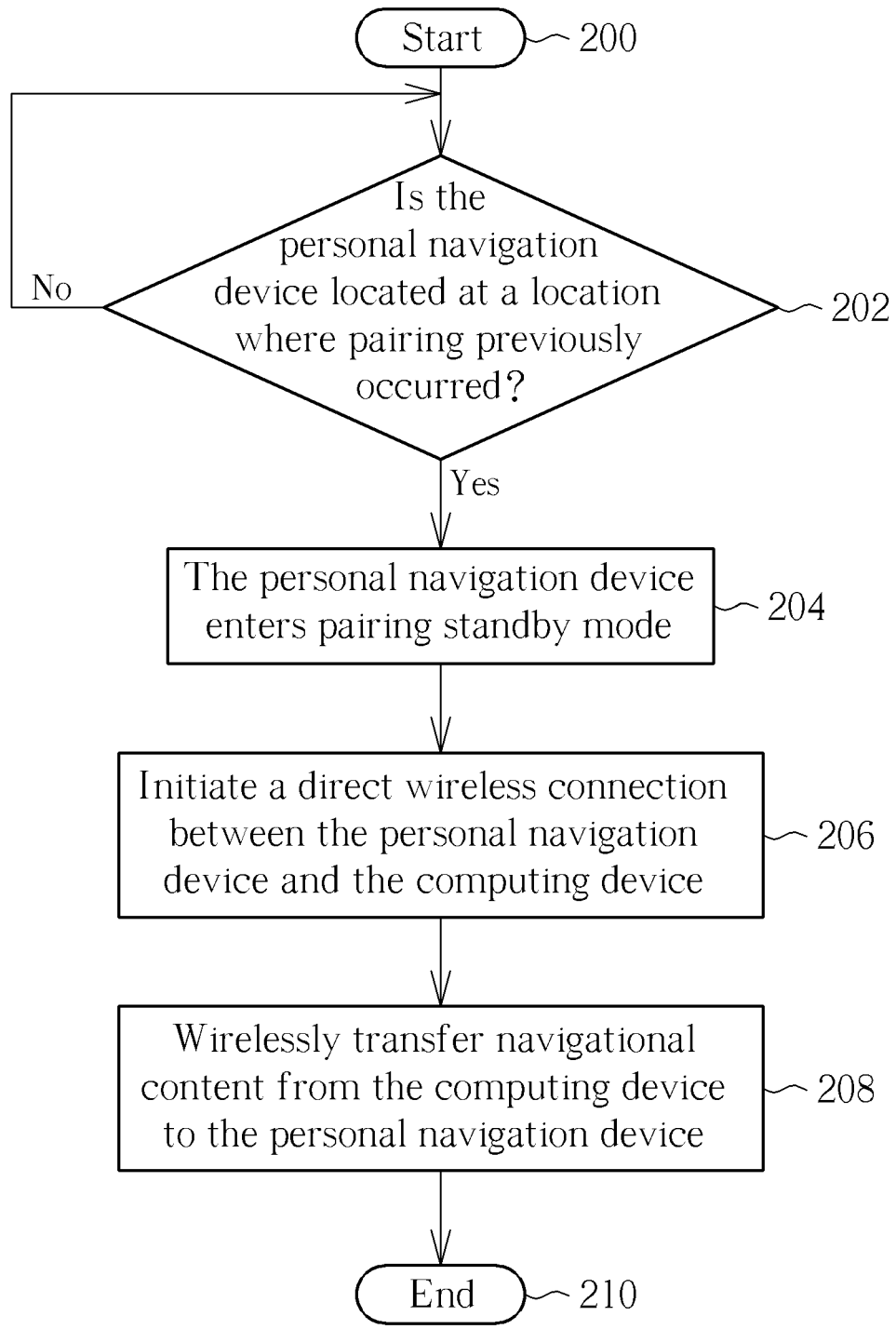

Please refer to FIG. 4. FIG. 4 is a flowchart illustrating another embodiment of the present invention method of adding navigational content to the personal navigation device 10 from the computing device 50. Steps contained in the flowchart will be explained below.

Step 200: Start.

Step 202: Determine if the personal navigation device 10 is located at a location where pairing previously occurred between the computing device 50 and the personal navigation device 10. If so, go to step 204. If not, repeat step 202.

Step 204: The personal navigation device 10 automatically enters pairing standby mode and waits for pairing with the computing device 50 to begin.

Step 206: The user initiates a direct wireless connection between the personal navigation device 10 and the computing device 50 while the personal navigation device 10 is in the pairing standby mode.

Step 208: Navigational content is wirelessly transferred from the computing device 50 to the personal navigation device 10.

Step 210: End. After the wireless communication is complete, the personal navigation device 10 may optionally turn itself off automatically so as to save power.

In the above embodiments, the personal navigation device 10 paired with the computing device 50 through a direct wireless connection. One advantage of this is the computing device 50 does not need to have a connection to the internet, and instead only needs the ability to communicate directly with other wireless devices, such as through an Ad-Hoc network connection, a high powered Bluetooth connection, or other similar direct wireless connections.

Figure 5:
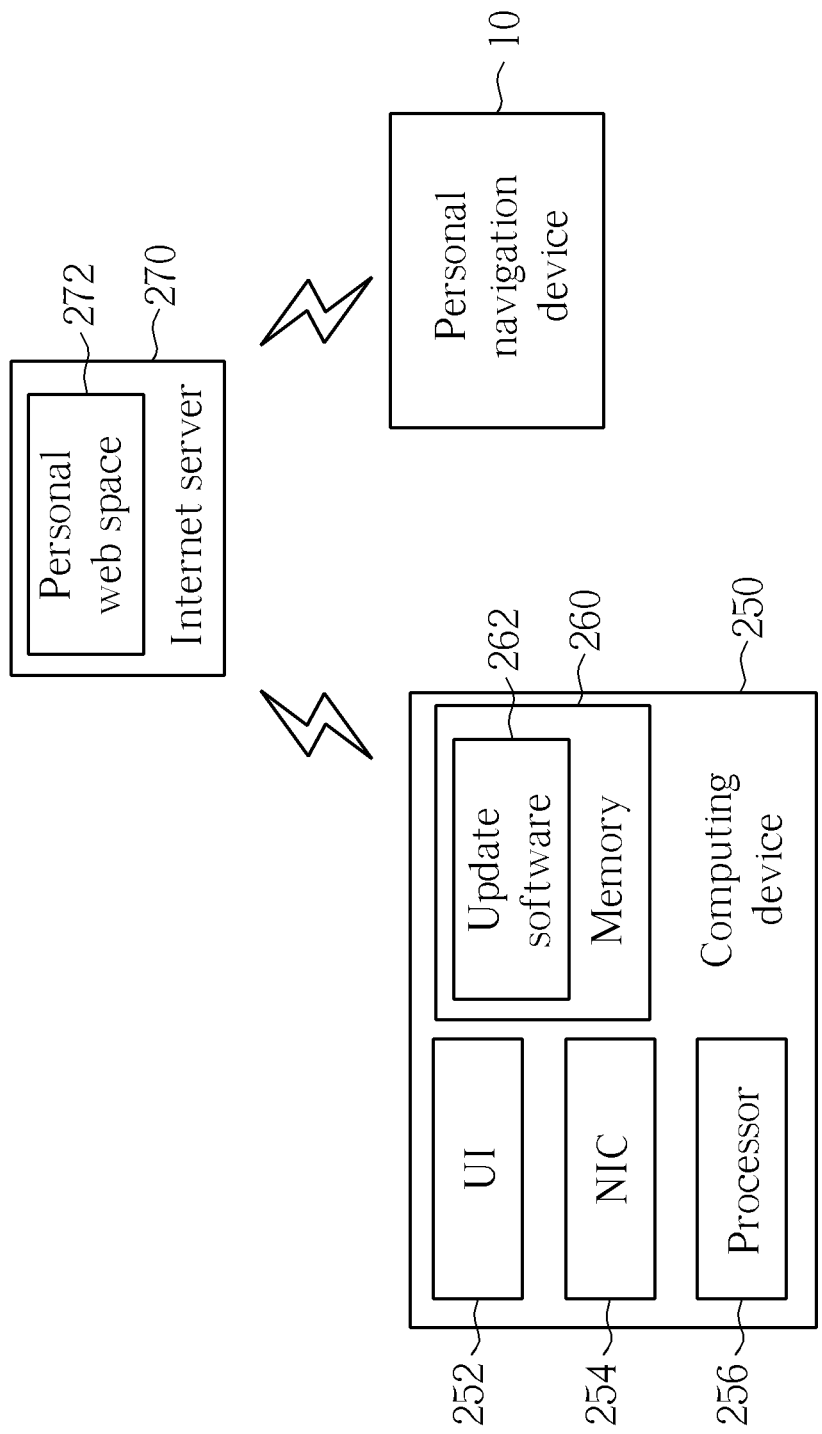
FIG. 5 is a functional block diagram showing a computing device storing navigational content on an internet server for later retrieval by the personal navigation device according to another embodiment of the present invention.

Please refer to FIG. 5. FIG. 5 is a functional block diagram showing a computing device 250 storing navigational content on an internet server 270 for later retrieval by the personal navigation device 10 according to another embodiment of the present invention. The personal navigation device 10 can be the same as that shown in FIG. 2, and is not explained again. The personal navigation device 10 connects to the Internet wirelessly, and can use any wireless connection specification in order to wirelessly receive data from the internet server 270.

The computing device 250 is very similar to the computing device 50 shown in FIG. 2. The main difference is that the computing device 250 contains a network interface controller (NIC) for establishing a connection to the internet instead of a wireless module for directly wirelessly communicating with the personal navigation device 10. The computing device 250 may be a variety of different devices, such as a computer, a mobile phone, a smart phone, or a personal digital assistant (PDA). The computing device 250 comprises a user interface (UI) 252 for allowing the user to input commands and data as well as to receive output from the computing device 250. The NIC 254 of the computing device 250 is used to communicate with the internet server 270 via the internet. The computing device 250 also includes a processor 256 for controlling operation of the computing device 250 as well as executing update software 262 stored in memory 260. The present invention includes different embodiments for wirelessly adding content from the computing device 250 to the personal navigation device 10, as will be explained below.

In the embodiment shown in FIG. 5, navigational content is not directly wirelessly transferred from a computing device 250 to the personal navigation device 10. Instead, the user makes use of personal web space 272 on the internet server 270 for storing navigational content created on the computing device 250. The personal web space 272 acts as a temporary storage for the navigational content until the personal navigation device 10 is able to connect to the internet and retrieve the navigational content.

Figure 6:
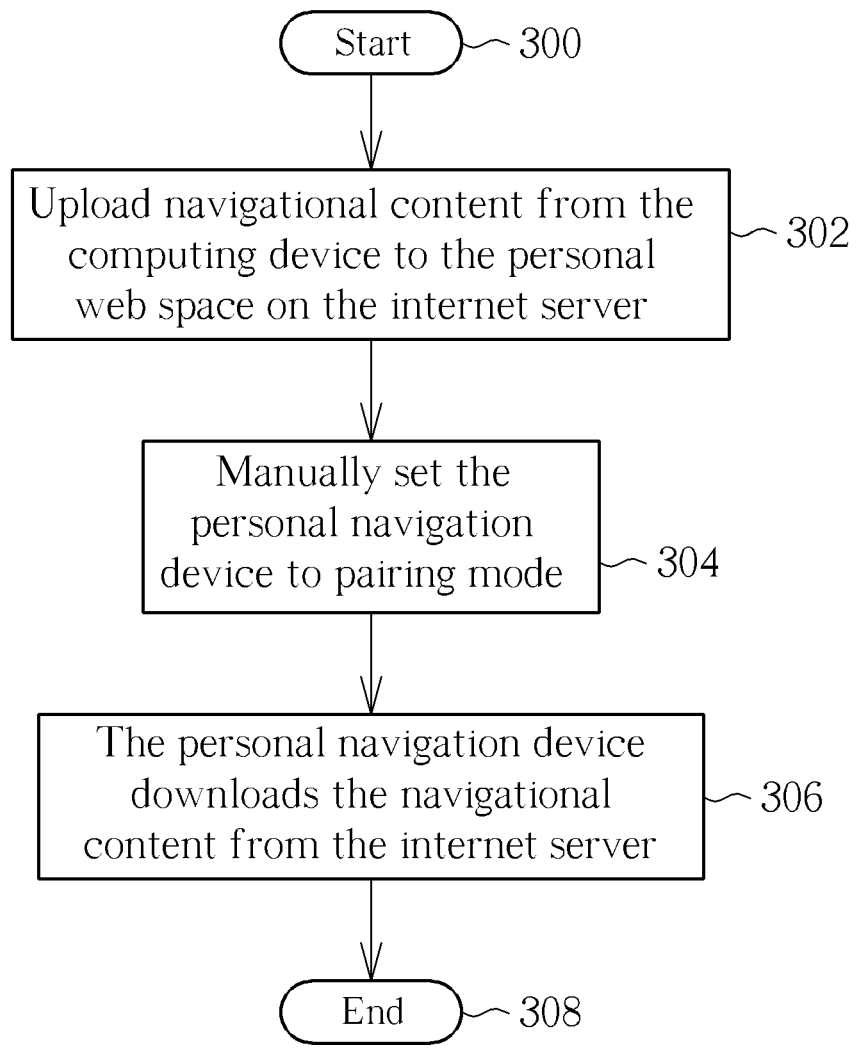
FIGS. 6-7 are flowcharts illustrating present invention methods of adding navigational content to the personal navigation device from the computing device via an internet server.

Please refer to FIG. 6. FIG. 6 is a flowchart illustrating the present invention method of adding navigational content to the personal navigation device 10 from the computing device 250 via an internet server 270. Steps contained in the flowchart will be explained below.

Step 300: Start.

Step 302: The user uploads navigational content from the computing device 250 to the personal web space 272 on the internet server 270.

Step 304: The user of the personal navigation device 10 manually sets the personal navigation device 10 to pairing mode using the mode switch 24.

Step 306: The personal navigation device 10 begins pairing with the internet server 270 if the personal navigation device 10 has an available internet connection, and the personal navigation device 10 downloads the navigational content from the internet server 270.

Step 308: End. After the wireless communication is complete, the personal navigation device 10 may optionally turn itself off automatically so as to save power.

In the embodiment shown in FIG. 6, the user manually sets the personal navigation device 10 to pairing mode using the mode switch 24. In another embodiment, the personal navigation device 10 can use the GPS receiver 22 to determine the current position of the personal navigation device 10 and automatically change the mode of the personal navigation device 10 to pairing mode when the personal navigation device 10 is located at a location at which pairing between the internet server 270 and the personal navigation device 10 has been authorized or has been performed before. These locations can include, for example, the user's home or office. This information about which locations have been previously used for pairing can be stored in the location data 36 of memory 30.

Alternatively, pairing can occur when the personal navigation device 10 is located within a predetermined radius of a location that was previously used for pairing and the personal navigation device 10 detects that the personal navigation device 10 is moving away from or starting to leave that location. Also, instead of considering the current location of the personal navigation device 10, the personal navigation device 10 can begin pairing as soon as the personal navigation device 10 detects that an internet connection is available.

Figure 7:
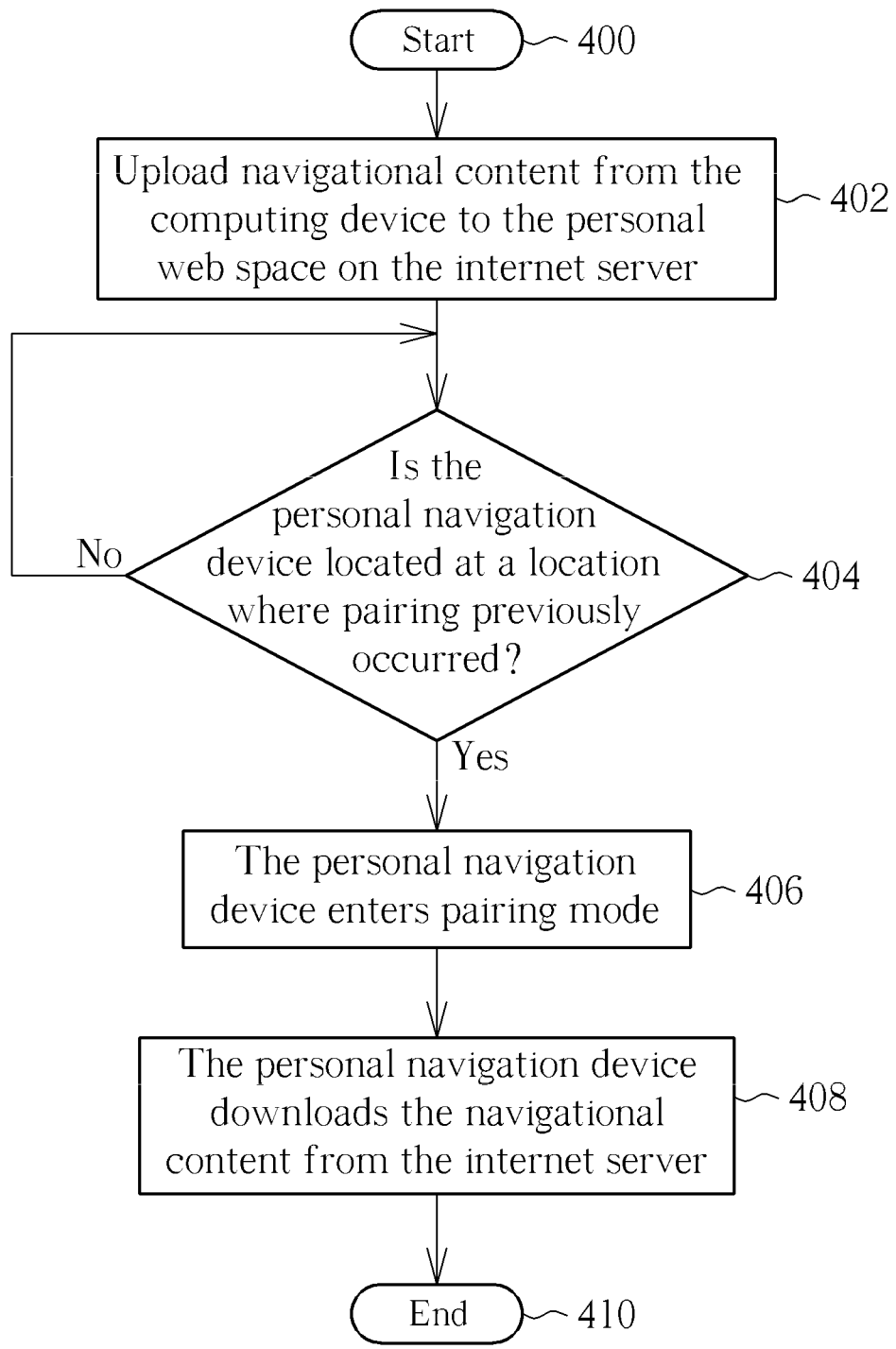

Please refer to FIG. 7. FIG. 7 is a flowchart illustrating another embodiment of the present invention method of adding navigational content to the personal navigation device 10 from the computing device 250 via an internet server 270. Steps contained in the flowchart will be explained below.

Step 400: Start.

Step 402: The user uploads navigational content from the computing device 250 to the personal web space 272 on the internet server 270.

Step 404: Determine if the personal navigation device 10 is located at a location where pairing previously occurred between the internet server 270 and the personal navigation device 10. If so, go to step 406. If not, repeat step 404.

Step 406: The personal navigation device 10 automatically enters pairing mode.

Step 408: The personal navigation device 10 begins pairing with the internet server 270 if the personal navigation device 10 has an available internet connection, and the personal navigation device 10 downloads the navigational content from the internet server 270.

Step 410: End. After the wireless communication is complete, the personal navigation device 10 may optionally turn itself off automatically so as to save power.

In summary, the present invention personal navigation device is able to wirelessly receive updated navigational content for avoiding the need to physically carry the personal navigation device to a computing device for pairing the personal navigation device with the computing device. The personal navigation device can either directly wirelessly communicate with the computing device for receiving the navigational content or can indirectly receive the navigational content from the computing device using an internet server as an intermediate storage space. In addition, the present invention should not be limited to the personal navigation device only receiving navigational content. In fact, the personal navigation device can also transmit navigational content to the computing device or to the internet server. This navigational content may include a user's traveling routes or a traveling diary created using the personal navigation device.

Those skilled in the art will readily observe that numerous modifications and alterations of the device and method may be made while retaining the teachings of the invention.

What is claimed is:

1. A method of wirelessly adding navigational content to a personal navigation device, the method comprising:
   adding navigational content to a computing device;
   changing a mode of the personal navigation device to pairing standby mode, comprising the personal navigation device automatically detecting that the personal navigation device is positioned at a location where adding navigational content has been previously performed by a user of the personal navigation device and the personal navigation device automatically detecting that the personal navigation device is positioned at a location which has been authorized by the user of the personal navigation device for adding navigational content, and automatically changing the mode of the personal navigation device to pairing standby mode when the personal navigation device is located at the authorized location or the location where adding navigational content has been previously performed; and establishing a direct wireless connection between the personal navigation device and the computing device to add the navigational content to the personal navigation device from the computing device when the personal navigation device and the computing device are within range of each other for establishing a wireless connection.

2. The method of claim 1, wherein changing the mode of the personal navigation device to pairing standby mode comprises the user of the personal navigation device manually switching the personal navigation device to pairing standby mode.

3. The method of claim 1, wherein the direct wireless connection is established according to high powered Bluetooth specifications or wireless local area network (WLAN) specifications.

4. The method of claim 1, wherein the personal navigation device automatically turns itself off after the personal navigation device and the computing device have completed transferring navigational content.

5. The method of claim 1, wherein the computing device is a computer, a mobile phone, or a personal digital assistant (PDA) having wireless network connection capability.

6. The method of claim 1, wherein the navigational content of the computing device is selected by the user or stored in a specific part of a memory of the computing device ahead of time for later transfer to the personal navigation device when direct wireless connection between the personal navigation device and the computing device has been established.

7. The method of claim 1 further comprising transferring navigational content from the personal navigation device to the computing device when the personal navigation device and the computing device have established a wireless connection.

8. The method of claim 1, wherein the direct wireless connection between the personal navigation device and the computing device is initiated by the computing device while the personal navigation device is in the pairing standby mode.

9. A method of wirelessly adding navigational content to a personal navigation device, the method comprising:
adding navigational content to a computing device;
uploading the navigational content from the computing device to an internet server through an internet connection of the computing device and storing the navigational content on the internet server;
changing a mode of the personal navigation device to pairing mode, comprising the personal navigation device automatically detecting that the personal navigation device is positioned at a location where adding navigational content has been previously performed by a user of the personal navigation device and the personal navigation device automatically detecting that the personal navigation device is positioned at a location which has been authorized by the user of the personal navigation device for adding navigational content, and automatically changing the mode of the personal navigation device to pairing mode when the personal navigation device is located at the authorized location or the location where adding navigational content has been previously performed; and
establishing a wireless internet connection for connecting the personal navigation device to the internet for downloading the navigational content from the internet server to the personal navigation device.

10. The method of claim 9, wherein changing the mode of the personal navigation device to pairing mode comprises the user of the personal navigation device manually switching the personal navigation device to pairing mode.

11. The method of claim 9, wherein changing the mode of the personal navigation device to pairing mode comprises:
recording an update location where the personal navigation device was located when navigational content was added to the personal navigation device;
detecting when the personal navigation device is located at the update location; and
automatically changing the mode of the personal navigation device to pairing mode when the personal navigation device is located at the update location.

12. The method of claim 9, wherein changing the mode of the personal navigation device to pairing mode automatically occurs when the personal navigation device is located within a predetermined radius of an update location where the navigational content was previously added to the personal navigation device and when the personal navigation device detects that the personal navigation device is moving away from the update location.

13. The method of claim 9, wherein changing the mode of the personal navigation device to pairing mode comprises:
detecting an internet connection available to the personal navigation device; and
automatically changing the mode of the personal navigation device to pairing mode when the personal navigation device detects the available internet connection.

14. The method of claim 9, wherein the wireless internet connection is established according to General Packet Radio Service (GPRS) specifications or wireless local area network (WLAN) specifications having wireless network connection capability.

15. The method of claim 9, wherein the personal navigation device automatically turns itself off after the personal navigation device and the computing device have completed transferring navigational content.

16. The method of claim 9, wherein the computing device is a computer, a mobile phone, or a personal digital assistant (PDA).

17. The method of claim 9 further comprising transferring navigational content from the personal navigation device to the internet server when the personal navigation device has established a wireless internet connection to the internet.

* * * * *